(12) United States Patent
Matono et al.

(10) Patent No.: US 10,078,880 B2
(45) Date of Patent: Sep. 18, 2018

(54) IMAGE PROCESSING DEVICE AND IMAGE PROCESSING SYSTEM

(71) Applicant: Hitachi Automotive Systems, Ltd., Hitachinaka-shi, Ibaraki (JP)

(72) Inventors: Haruki Matono, Tokyo (JP); Yuji Otsuka, Hitachinaka (JP); Atsushi Ichige, Hitachinaka (JP); Yoshiyuki Muto, Hitachinaka (JP); Takeshi Shima, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 222 days.

(21) Appl. No.: 14/910,902

(22) PCT Filed: May 26, 2014

(86) PCT No.: PCT/JP2014/063766
§ 371 (c)(1),
(2) Date: Feb. 8, 2016

(87) PCT Pub. No.: WO2015/019680
PCT Pub. Date: Feb. 12, 2015

(65) Prior Publication Data
US 2016/0189330 A1    Jun. 30, 2016

(30) Foreign Application Priority Data

Aug. 7, 2013   (JP) .................................. 2013-163692

(51) Int. Cl.
*H04N 15/00*     (2006.01)
*G06T 1/20*      (2006.01)
(Continued)

(52) U.S. Cl.
CPC ................ *G06T 1/20* (2013.01); *G06F 13/24* (2013.01); *G06T 1/60* (2013.01); *H04N 13/0239* (2013.01);
(Continued)

(58) Field of Classification Search
CPC ....... G06F 13/24; G06T 1/20; H04N 13/0239; H04N 13/0296
See application file for complete search history.

(56) References Cited

U.S. PATENT DOCUMENTS

2005/0225659 A1   10/2005  Kazami
2007/0065022 A1    3/2007  Miyamoto
2009/0122153 A1*   5/2009  Fukui ..................... H04N 5/772
                                                    348/222.1

FOREIGN PATENT DOCUMENTS

JP    11-312138 A     11/1999
JP    2000-232596 A    8/2000
(Continued)

OTHER PUBLICATIONS

International Search Report (PCT/ISA/210) issued in PCT Application No. PCT/JP2014/063766 dated Jul. 15, 2014 with English translation (four pages).

*Primary Examiner* — Sathyanaraya V Perungavoor
*Assistant Examiner* — Peet Dhillon
(74) *Attorney, Agent, or Firm* — Crowell & Moring LLP (57) ABSTRACT

The present invention provides CPU load reduction and a method of efficient image data transfer. An image processing device, which comprises an image generating unit (203) which further comprises a plurality of processing units which process a plurality of instances of image information and in where the image generating unit (203) transfers accumulated data for each interrupt factor, comprises: data transfer units for each factor (208-212) which accept the interrupts from the image generating unit (203) for each
(Continued)

interrupt factor and transfer the data for each interrupt factor, and notifies a CPU (207) of the interrupt when the transfer of the data to be transferred for each interrupt factor is completed; and a communication line (1) which is connected to the image generating unit (203) and the data transfer units for each factor (208-212).

7 Claims, 6 Drawing Sheets

(51) Int. Cl.
*G06F 13/24* (2006.01)
*H04N 13/02* (2006.01)
*G06T 1/60* (2006.01)

(52) U.S. Cl.
CPC ..... *H04N 13/0296* (2013.01); *G06T 2200/28* (2013.01)

(56) References Cited

FOREIGN PATENT DOCUMENTS

| | | |
|---|---|---|
| JP | 2005-348046 A | 12/2005 |
| JP | 2007-88806 A | 4/2007 |
| JP | 2007-241588 A | 9/2007 |
| JP | 2009-140484 A | 6/2009 |

* cited by examiner

IMAGE PROCESSING DEVICE AND IMAGE PROCESSING SYSTEM

TECHNICAL FIELD

The present invention relates to a device for processing image data.

BACKGROUND ART

As a background art in this technical field, there is an interrupt control system disclosed in JP 11-312138 A (PTL 1). This publication describes "to provide an interrupt control system capable of, for example, reducing a load of a CPU, reducing an interrupt detection time, and reducing a wasteful use of a system bus" as an object and describes "each of a plurality of devices 7 to 9 transfers information of an interrupt factor register to a main memory 5 monitored by a CPU 1 by using DMA at the same timing as the timing of an interrupt so that read processing of the interrupt factor register for all the devices, which is executed by the CPU 1, is reduced by one DMA transfer. Therefore, the CPU 1 can quickly recognize interrupt factors of the devices, and, in addition, a processing time can be reduced and the wasteful use of the system bus can be removed, which results in reduction in the loads of the CPU and the system bus." as solving means (see ABSTRACT).

CITATION LIST

Patent Literature

PTL 1: JP 11-312138 A

SUMMARY OF INVENTION

Technical Problem

However, in the interrupt control system of PTL 1, the CPU needs to monitor the main memory to monitor an interrupt, and therefore it is problematic in that the load of the CPU is not satisfactorily reduced.

An object of the invention is to provide CPU load reduction and a method of efficient image data transfer.

Solution to Problem

In order to achieve the object, an image processing device according to the present invention includes an image generating unit including a plurality of processing units for processing a plurality of instances of image information, the image generating unit being for transferring accumulated data for each interrupt factor, and the device includes: a data transfer unit for each factor for accepting an interrupt for the each interrupt factor from the image generating unit, transferring data for the each interrupt factor, and notifying a CPU of an interrupt when transfer of data to be transferred for the each interrupt factor is completed; and a communication line connected to the image generating unit and the data transfer unit for each factor. The data transfer unit for each factor may include a first interrupt control unit for outputting an interrupt signal upon receipt of a notification of data transfer from the image generating unit, a factor control unit for changing a transfer address of a transfer destination for the each interrupt factor upon receipt of the interrupt signal, and a second interrupt control unit for transmitting an interrupt signal to the CPU when transfer of the data to be transferred for the each interrupt factor is completed.

Advantageous Effects of Invention

It is possible to reduce a processing load of a CPU because interrupt processing during data transfer is unnecessary. Problems, configurations, and effects other than those described above will be disclosed in the description of embodiments below.

DESCRIPTION OF EMBODIMENTS

Examples according to the present invention will be described below with reference to drawings.

Example 1

An image processing device for detecting a three-dimensional object will be described in this example.

In recent years, a moving object detecting device for detecting a moving object such as a pedestrian or a vehicle by using a plurality of image pickup units (cameras), such as a stereo camera, has been implemented as a form of the image processing device. The stereo camera is a device that calculates a positional shift (parallax) of the same target object (three-dimensional object) in a plurality of images captured at the same time by using template matching and calculates a position of the target object (three-dimensional object) in a real space on the basis of the calculated parallax by using a well-known conversion formula.

This stereo camera calculates a distance from the target object such as a pedestrian by using a pair of images captured by two image pickup units, thereby recognizing the target object, and is applicable to a monitoring system for detecting entry of a suspicious person and abnormality, an in-vehicle system for assisting safe driving of a vehicle, and the like.

The stereo camera used in the monitoring system and the in-vehicle system described above obtains a distance by applying a triangulation technique to a pair of images captured at a certain position interval and generally includes at least two image pickup units and stereo image processing LSI (Large Scale Integration) serving as an image processing unit for performing triangulation processing on two captured images captured in those image pickup units. This stereo image processing LSI serving as the image processing unit realizes the triangulation processing by performing the following processing: pieces of pixel information contained in the pair of images are overlapped to obtain an amount of shift (parallax) between corresponding positions in the two images. Therefore, ideally, shift other than the parallax does not exist in the pair of images, and it is necessary to make an adjustment so that no shift in optical characteristic or signal characteristic exists between the image pickup units or to obtain, for example, a positional relationship between the cameras in advance.

Figure 1:
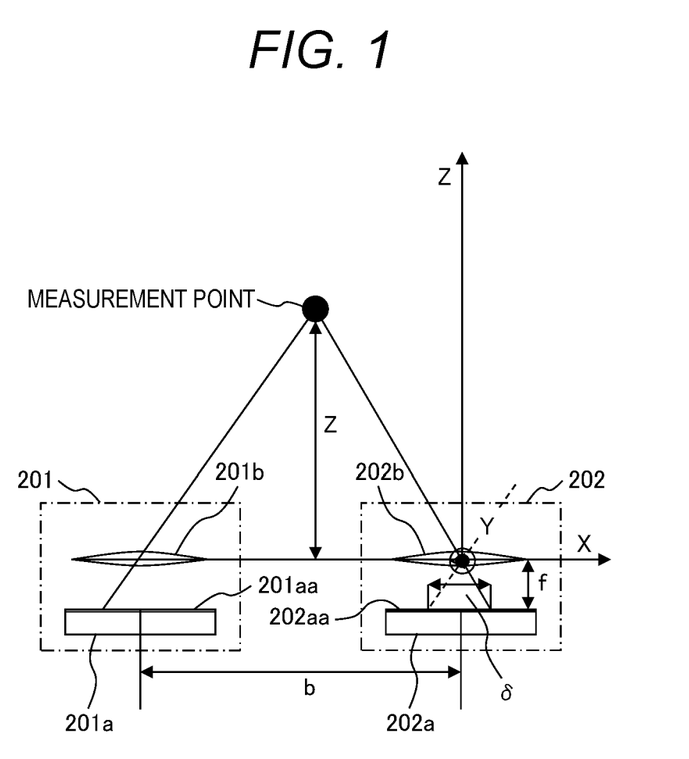
FIG. 1 is a diagram for explaining a principle of triangulation.

FIG. 1 shows a principle of a stereo camera. The stereo camera includes two cameras 201 and 202. The camera 201 includes an image pickup unit 201a and a lens 201b, and the camera 202 includes an image pickup unit 202a and a lens 202b. The image pickup unit 201a has an image pickup surface (image pickup element) 201aa, and the image pickup unit 202a has an image pickup surface (image pickup element) 202aa.

In FIG. 1, δ indicates a parallax, Z indicates a measurement distance (distance between lens and measurement point), f indicates a focal distance (distance between image pickup surface and lens), and b indicates a length of a base line (length between two image pickup elements), and a relationship of the following formula 1 is satisfied among them.

[Math. 1]

$$Z = bf/\delta \qquad (1)$$

Figure 2:
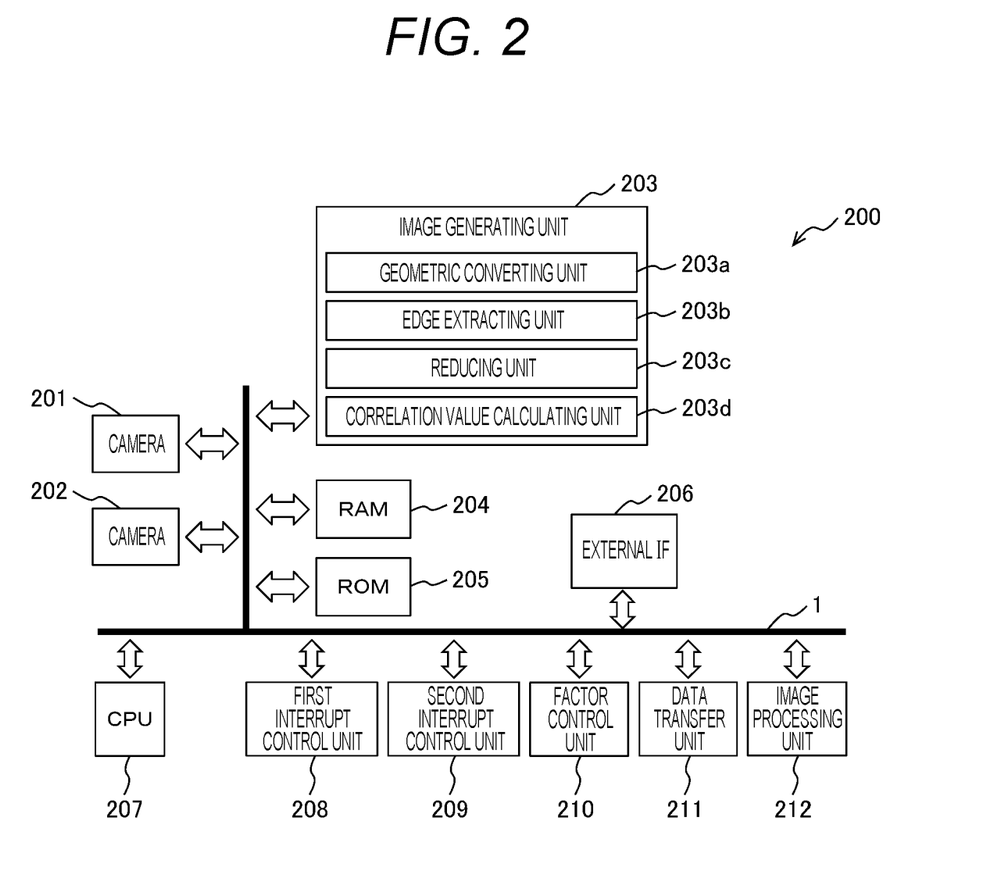
FIG. 2 shows an entire configuration of an image processing device in Example 1.

FIG. 2 shows an entire configuration of an image processing device in Example 1 of the present invention.

A stereo camera is targeted as the image processing device in this example, and the image processing device includes the camera 201 serving as a first image pickup unit and the camera 202 serving as a second image pickup unit and is configured to measure a distance in stereo. The image processing device in this example further includes an image generating unit (image processing unit) 203 for processing images output from the camera 201 and the camera 202, a RAM (temporary storage device) 204 serving as a temporary storage area, a ROM 205 for storing programs and various initial values, an external IF 206 serving as communication means for notifying a control system such as a brake or a user of recognition states of the cameras, a CPU 207 for controlling an entire system, a first interrupt control unit 208 for receiving an output signal from the image generating unit 203, a factor control unit 210 for controlling an interrupt factor in accordance with output of the first interrupt control unit 208, a data transfer unit 211 for transferring data in accordance with output of the factor control unit 210, and an image processing unit 212 for processing a result output from the data transfer unit 211. Those units can transmit/receive data to/from each other via a bus 1 serving as a communication line.

The camera 201 and the camera 202 are image pickup elements such as a CCD (Charge Coupled Device Image Sensor) and a CMOS (Complementary Metal Oxide Semiconductor) sensor.

The image generating unit 203 is a block for performing control of the camera 201 and the camera 202 and has a function of performing control so that the two cameras have the same image pickup timing and a function of performing control so that the cameras have the same light exposure. This is to achieve the same luminance value in the case where corresponding points in both the cameras are searched with the use of the camera 201 and the camera 202. The image generating unit 203 includes a geometric converting unit 203a, an edge extracting unit 203b, a reducing unit 203c, and a correlation value calculating unit 203d and outputs calculation results thereof.

The geometric converting unit 203a performs image processing so that distortion of images of the camera 201 and the camera 202, which is caused by lenses, is corrected and the camera 201 and the camera 202 are in parallel to each other. A calculation method is, for example, a method in which a readout position table for each pixel is prepared in advance and an image is reconstructed in accordance with the readout position table for each pixel or a method in which horizontal movement, vertical movement, enlargement/reduction, rotation, and shearing calculations are performed in combination.

The edge extracting unit 203b implements edge detection processing with respect to input images of the camera 201 and the camera 202. For example, a horizontal edge strength image is generated by setting a difference between adjacent luminance values in a horizontal direction in the image as an edge strength. Similarly, a vertical edge strength image is generated by setting a difference between luminance values in the vertical direction as an edge strength. Further, an edge direction can be calculated on the basis of the edge strength that is the difference between the adjacent luminance values in the horizontal direction and the edge strength that is the difference between the luminance values in the vertical direction and an edge direction image may be output. The present invention does not limit a method for detecting an edge. Information such as the edge strength and the edge direction can be used in processing for recognizing a person, an automobile, and the like.

The reducing unit 203c can arbitrarily reduce input images of the camera 201 and the camera 202. In the case where an object largely reflected in each of the cameras 201 and 202 is processed by using a reduced image, a calculation amount is small, and therefore this processing is useful.

The correlation value calculating unit 203d searches positions having a high correlation in the horizontal direction from images obtained from the camera 201 and the camera 202 and performs calculation for specifying the positions. A difference between a search start position of the camera 201 of the stereo camera and a position having a highest correlation therewith in the camera 202 is the parallax δ. A large parallax δ indicates that a distance from an object is short, whereas a small parallax δ indicates that the distance from the object is long. As a method for calculating a correlation value in this example, the sum of absolute differences is used, but the present invention is not limited thereto. In order to calculate a correlation value, several pixels are assumed to be one block and blocks are compared with each other.

Figure 3:
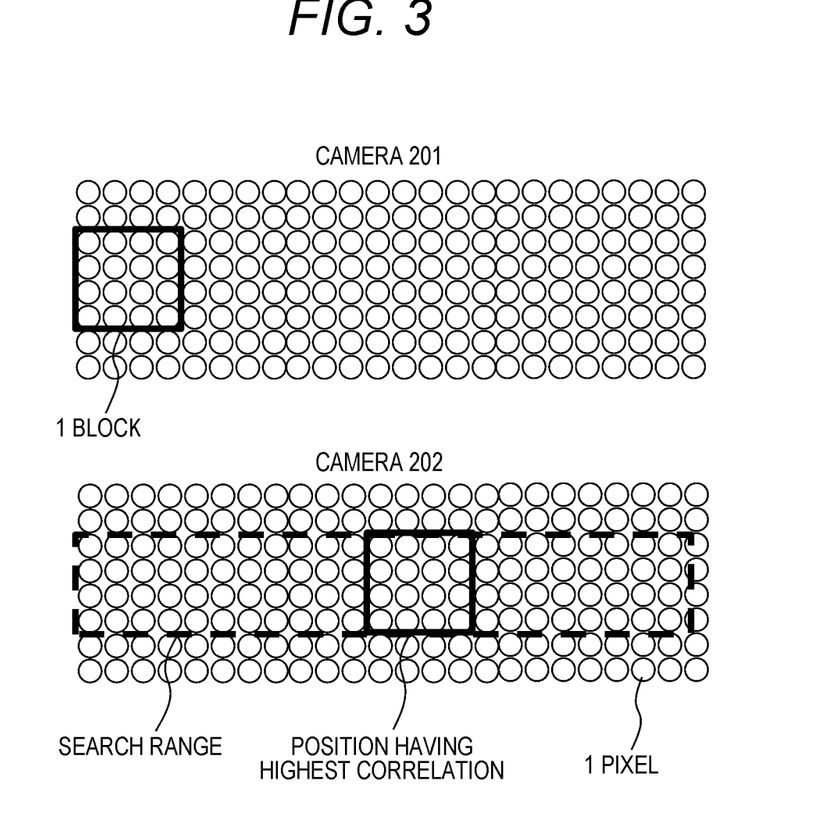
FIG. 3 is an explanatory view of calculation of a correlation value.

FIG. 3 illustrates an image obtained when one block includes four vertical pixels and four horizontal pixels. An area surrounded by a dotted line shows a state in which one block of the camera 201 is assumed to be a template and is searched from an image of the camera 202. This search processing is performed for each block size of the camera 201, and thus a parallax image is generated. Resolution of the parallax image is a quarter of resolution of the image because one parallax is obtained for every four vertical pixels and four horizontal pixels. The parallax image can be converted into a distance for each pixel and is therefore useful information for, for example, detecting a three-dimensional object.

The image generating unit 203 generates a plurality of pieces of image data on the basis of images captured in the cameras 201 and 202 as described above. Generation of the image data can be realized by small-scale and low-cost hardware by processing data output from the cameras 201 and 202 for every several lines. However, the image data of the cameras 201 and 202 is continuously output and therefore cannot be stored for a long time. In view of this, the image generating unit 203 stores several lines of the data therein, and, when a certain amount of the data is accumulated, the data is transferred to another location.

Figure 4:
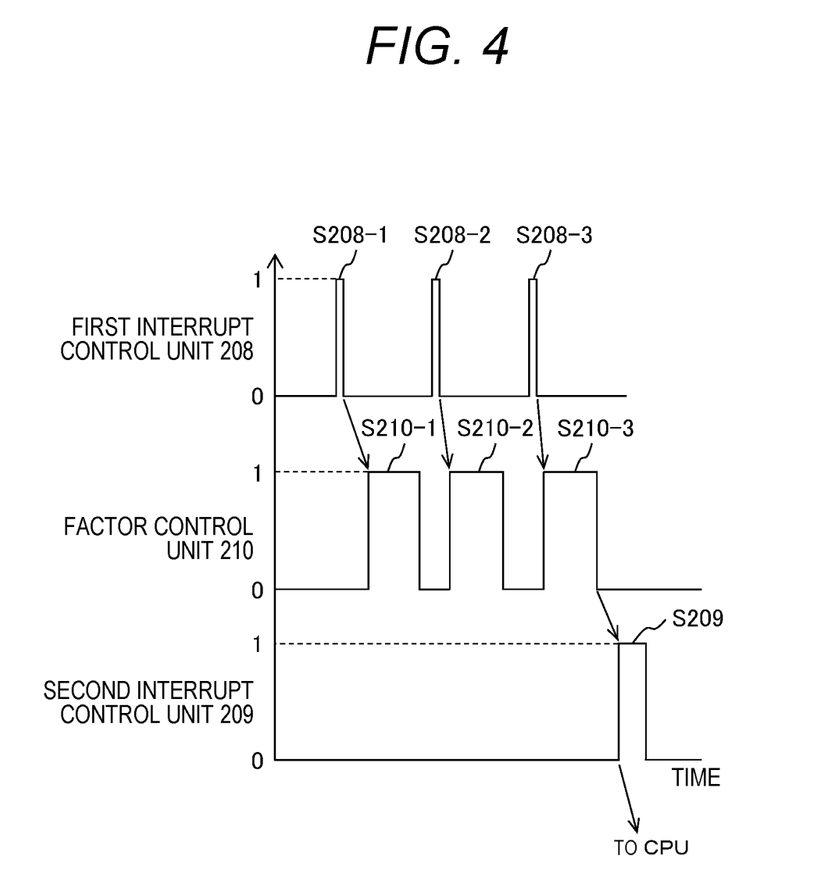
FIG. 4 shows a timing chart regarding output of signals of a first interrupt control unit, a factor control unit, and a second interrupt control unit.

Transfer of data will be described with reference to FIG. 4. FIG. 4 shows a timing chart regarding output of signals of a first interrupt control unit, a factor control unit, and a second interrupt control unit.

In the case where a certain amount of data is accumulated, the image generating unit 203 notifies the first interrupt control unit 208 of an interrupt. Upon receipt of this notification, the first interrupt control unit 208 outputs a signal S208-1 (ON: 1 signal) to notify the factor control unit 210 of start of factor control. The factor control unit 210 determines which image is accumulated in the image generating unit 203 and starts the data transfer unit 211 for the accumulated image in accordance with transfer information specified by the CPU 207 in advance (signal S210-1). The transfer information contains, for example, an ID for each factor, a transfer destination address, a transfer source address, a transfer size, and a present transfer size. The factor control unit 210 is repeatedly notified of start of factor control from the first interrupt control unit 208 (signals S208-2, S208-3) and therefore transfers data of each image to the RAM 204 from the image generating unit 203 while updating the transfer information each time (signals S210-2, S210-3). When the transfer size matches the present transfer size, the factor control unit 210 notifies the second interrupt control 209 of a transfer end notification together with the image ID (signal S210-3). Herein, the data transfer unit 211 can also transfer the data via the image processing unit 212. The image processing unit 212 holds, for example, an image processing table (processing information) including an ID for each factor, a top skipping size, and a transfer size. An end skipping size may also be held. The image processing unit 212 determines whether to transfer the data to the RAM 204 in accordance with the image processing table. With this, unnecessary data is not stored in the RAM 204. Further, because a transfer amount of the image is reduced, a load of the bus 1 can also be reduced, and therefore the CPU 207 can operate at a high speed. This is because a program of the CPU 207 is stored in the RAM 204, and, when a timing at which a command is readout and a timing of the data transfer 211 are overlapped, the bus 1 is arbitrated and the CPU 207 enters a wait state.

A method for storing data in the RAM 204 will be described. Data is transferred to the RAM 204 from the image generating unit 203 via the data transfer unit 211. Then, the CPU 207 executes various kinds of processing by using the data transferred to the RAM 204. The image generating unit 203 processes the next image while the CPU 207 is executing the various kinds of processing, and data is transferred to the RAM 204 via the data transfer unit 211. Therefore, an area of the RAM 204 is divided into at least two parts, and, when the CPU 207 executes the various kinds of processing, the areas are switched for each frame so that image data in the area is not updated.

The second interrupt control unit 209 determines whether to perform notification of an interrupt every time when transfer of an image is ended. Because of this, the second interrupt control unit 209 has an interrupt permission table for each image. This interrupt permission table is set in advance by the CPU 207. The second interrupt control unit 209 receives a transfer end notification and an image ID thereof from the factor control unit 210 and notifies the CPU 207 of an interrupt in accordance with the interrupt permission table for each image (signal S209).

Thus, the CPU 207 can execute the various kinds of processing without being conscious of data transfer processing or being interrupted until all the data output from the image generating unit 203 is accumulated.

Note that the bus 1 may be an internal bus or an external bus and is not limited by the present invention. However, the present invention has a larger effect in the case of the external bus because a speed of the external bus is generally lower than that of the internal bus.

Example 2

In this example, an example of an image processing device that can perform processing while further reducing an influence of an interrupt caused by data transfer on a CPU will be described. This example is an example regarding division of a bus.

Figure 5:
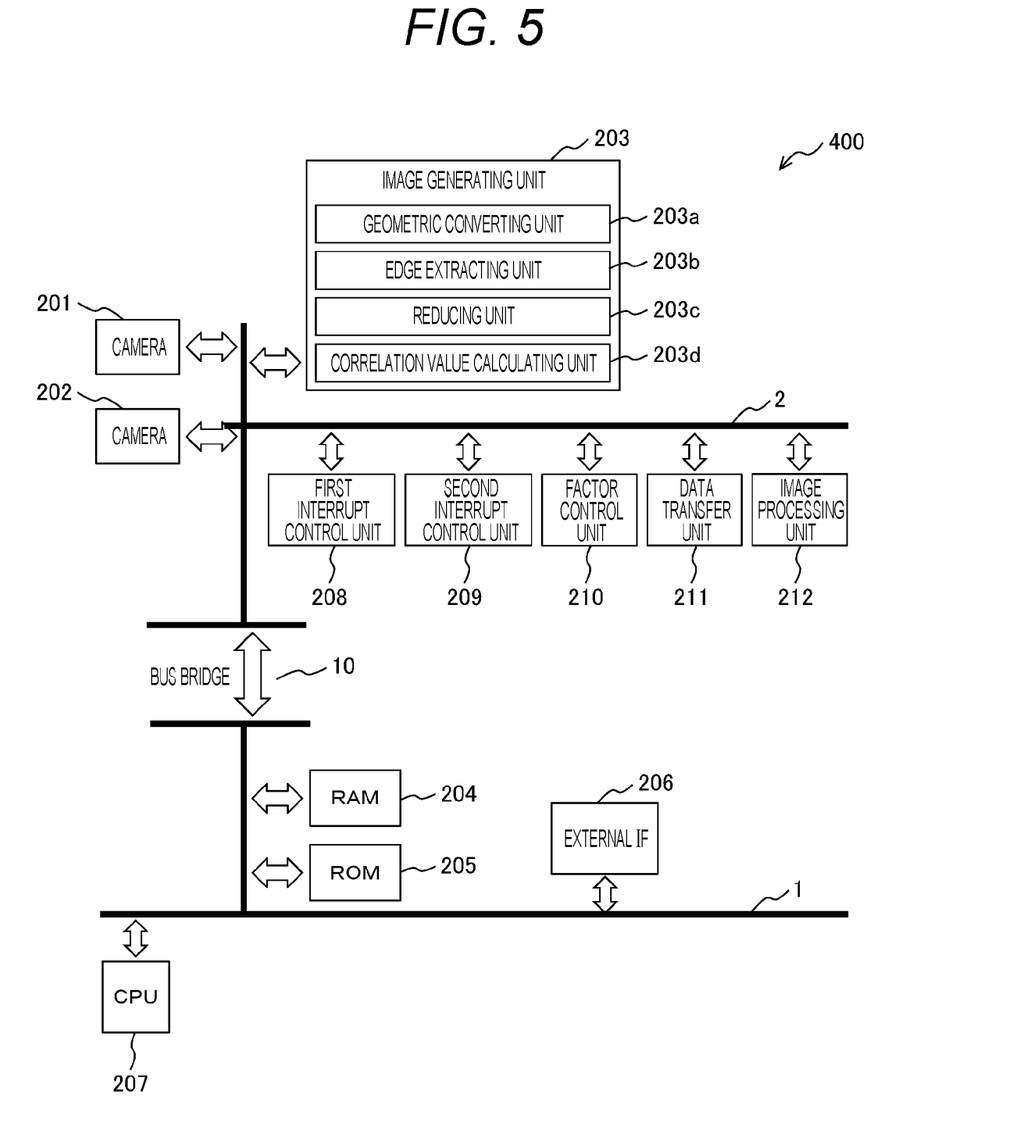
FIG. 5 shows an entire configuration of an image processing device in Example 2.

FIG. 5 is a configuration diagram of an image processing device 400 in Example 2.

In the image processing device 200 in FIG. 2, parts having the same functions as those of configurations denoted by the same reference signs in FIG. 2 already described above will not be described again.

The camera 201, the camera 202, the image generating unit 203, the first interrupt control unit 208, the second interrupt control unit 209, the factor control unit 210, the data transfer unit 211, and the image processing unit 212 are connected to a bus 2. The CPU 207, the RAM 204, the ROM 205, and the external IF 206 are connected to the bus 1. The bus 1 and the bus 2 are connected via a bus bridge 10. In this configuration, processing regarding interrupts is performed in the bus 2, and data is transferred to the RAM 204 via the bus bridge 10. At this time, the bus 1 can execute readout from the CPU 207 at any time, and therefore the CPU can operate more efficiently, as compared with the configuration of Example 1. Note that each of the buses 1 and 2 may be an internal bus or an external bus and is not limited by the present invention. However, the present invention has a larger effect in the case of the external bus because a speed of the external bus is generally lower than that of the internal bus.

Example 3

In this example, an example of an image processing device that achieves both reduction in interrupts of data transfer and flexible processing will be described. This example is an example where whether to perform a notification to the CPU is set for each interrupt factor. A configuration of the image processing device is similar to the configuration in FIG. 2 or FIG. 5.

In the case where a plurality of images is processed, an image to be preferentially processed exists in some cases. For example, because a distance image is useful for specifying a position of a three-dimensional object, the distance image is first analyzed, and a camera image is referred to only in a place where the three-dimensional object is likely to exist.

In this case, in the case where setting is performed in advance in the second interrupt control unit 209 described in Example 1 or 2 so that the CPU is notified of an interrupt when transfer of a distance image is ended, it is possible to start processing in the CPU without waiting gathering of all images, and therefore the CPU can be used more efficiently. This allows the second interrupt control unit 209 to select whether to perform notification of an end interrupt of data transfer for each interrupt factor. Further, in the case where the interrupt control unit 209 includes a circuit for notifying the CPU 207 of an interrupt when transfer of all images is ended, the CPU 207 can minimize interrupt processing. Therefore, processing of the CPU can be efficiently performed.

Example 4

Figure 6:
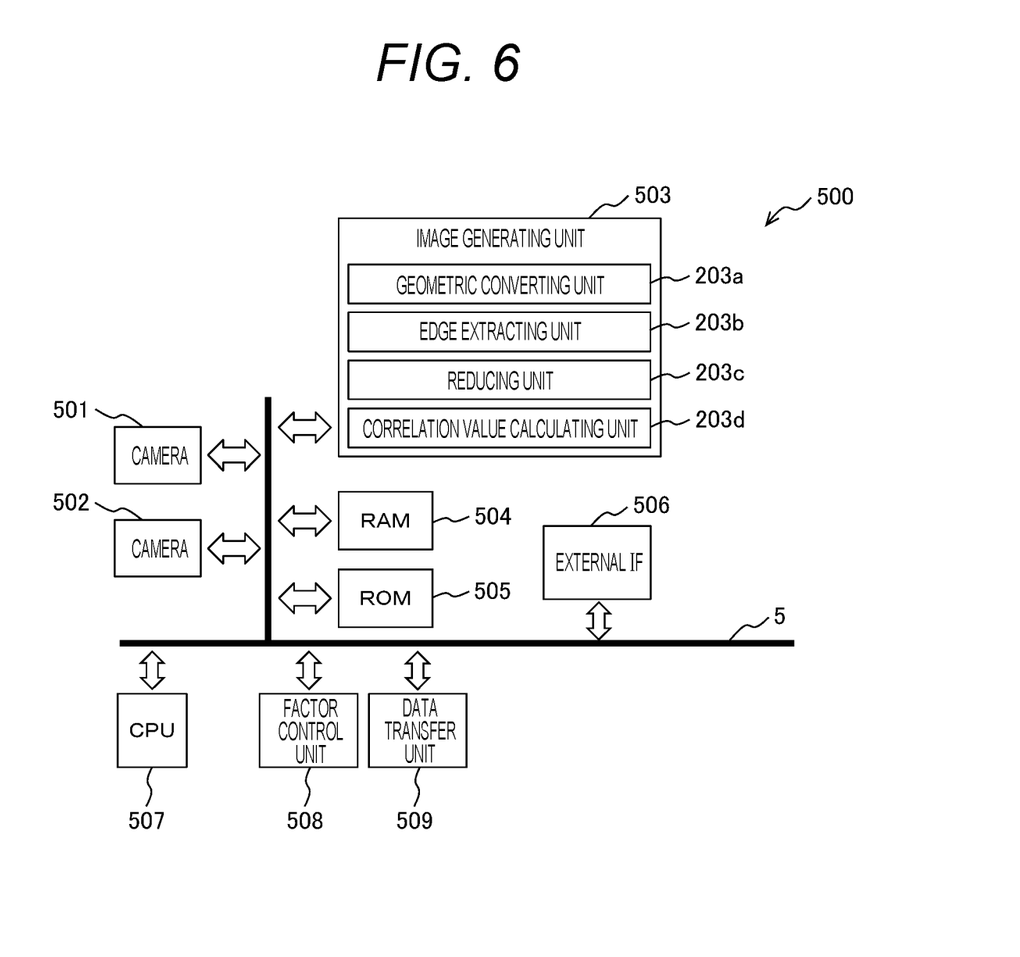
FIG. 6 shows an entire configuration of an image processing device in Example 4.

FIG. 6 shows an entire configuration of an image processing device that is a stereo camera in Embodiment 4 of the present invention.

The image processing device includes a camera 501 serving as a first image pickup unit and the camera 502 serving as a second image pickup unit and is configured to measure a distance in stereo. The image processing device further includes an image generating unit (image processing unit) 503 for processing images output from the camera 501 and the camera 502, a RAM (temporary storage device) 504 serving as a temporary storage area, a ROM 505 for storing programs and various initial values, an external IF 506 serving as communication means for notifying a control system such as a brake or a user of recognition states of the cameras, a CPU 507 for controlling an entire system, a factor control 508 for controlling an interrupt factor in accordance with output of an interrupt signal of the image generating unit 503, and a data transfer 509 for transferring data in accordance with output of the factor control 508. Those units can transmit/receive data to/from each other via a bus 5 serving as a communication line.

The image generating unit 503 receives image data output from the camera 501 and the camera 502 and outputs a plurality of images, such as a distance image that is a result of calculation of a distance of each pixel and an edge image showing a strength of an edge in an image, and calculation results. A method for transferring such output data will be described. In order to save a memory included in the image generating unit 503, the image generating unit 503 processes an image input from the camera 501 or 502 for each line. That is, in the case where a line memory is accumulated for each image, data needs to be read out and saved in the RAM 504. Herein, the plurality of images is generated, but the images are accumulated for each line at random because output timings for the respective kinds of processing are different. In view of this, the image generating unit 503 notifies the factor control unit 508 that the line memory is accumulated for each image. The CPU 507 performs various kinds of calculation by using various kinds of image data stored in the RAM 504. At this time, calculation and management can be easily performed when the various kinds of data are consecutively arranged for each image in the memory. In view of this, the factor control unit 508 manages addresses used at the time of transfer to the RAM 504 so that the various kinds of data are neatly arranged for each image and transmits a transfer request to the data transfer unit 509. When transfer of all the images is ended, the factor control unit 508 notifies the CPU 507 of an interrupt indicating that transfer of all the images has been ended. With this, also in a system to which a plurality of images is transferred, the CPU 507 only needs to accept an end interrupt, and therefore, processing can be minimized.

In this example, functions of the first interrupt control unit 208 and the second interrupt control unit 209 in the examples are integrated into the factor control unit 508. That is, the factor control unit 508 serves as the first interrupt control unit 208 and the second interrupt control unit 209.

REFERENCE SIGNS LIST 200 image processing device
203 image generating unit
208 first interrupt control unit
209 second interrupt control unit
210 factor control unit
211 data transfer unit
212 image processing unit
500 image processing device
503 image generating unit
508 factor control unit
509 data transfer unit

The invention claimed is:

1. An image processing device including an image generating unit including a plurality of processing units for processing a plurality of instances of image information, the image generating unit transferring accumulated data for each of a plurality of interrupt factors, the image processing device comprising:
   a data transfer unit for accepting an interrupt for the each of the interrupt factors from the image generating unit, transferring data for the each of the interrupt factors, and notifying a CPU of an interrupt when transfer of data to be transferred for the each of the interrupt factors is completed; and
   a communication line connected to the image generating unit and the data transfer unit;
   wherein the second interrupt control unit can select whether to perform notification of a data transfer end interrupt for the each of the interrupt factors.

2. The image processing device according to claim 1, wherein
   the data transfer unit includes a first interrupt control unit for outputting an interrupt signal upon receipt of a notification of data transfer from the image generating unit, a factor control unit for changing a transfer address of a transfer destination for the each interrupt factor upon receipt of the interrupt signal, and a second interrupt control unit for transmitting an interrupt signal to the CPU when transfer of the data to be transferred for the each of the interrupt factors is completed.

3. The image processing device according to claim 2, wherein
   the data transfer unit includes an image processing unit for processing image information for the each of the interrupt factors.

4. The image processing device according to claim 3, wherein
   the image processing device includes a first communication line connected to the image generating unit and a second communication line connected to the first interrupt control unit, the factor control unit, the image processing unit, and the second interrupt control unit, and the first communication line and the second communication line are connected to each other via a bus bridge.

5. The image processing device according to claim 3, wherein
   the image processing unit holds processing information for the each of the interrupt factors and transfers data in accordance with the processing information set in advance.

6. The image processing device according to claim 5, wherein
   a transfer size is held as the processing information, and an amount of data corresponding to the transfer size is transferred, and data subsequent to the amount of data corresponding to the transfer size is not transferred.

7. An image processing system including an image generating unit including a plurality of processing units for processing a plurality of instances of image information, a temporary storage device to which data processed in the image generating unit is transferred, and a CPU for executing various kinds of processing by using the data transferred to the temporary storage device, the image generating unit transferring accumulated data for each of a plurality of interrupt factors to the temporary storage device, the image processing system comprising:
- a data transfer unit for accepting an interrupt for the each of the interrupt factors from the image generating unit, transferring data for the each of the interrupt factors, and notifying the CPU of an interrupt when transfer of data to be transferred for the each of the interrupt factors is completed; and
- a communication line connected to the image generating unit and the data transfer unit;
- wherein the second interrupt control unit can select whether to perform notification of a data transfer end interrupt for the each of the interrupt factors.

* * * * *